Nov. 19, 1968  J. R. McDONALD  3,411,285
WIRE PAY-OFF APPARATUS
Filed July 28, 1966

INVENTOR.
JAMES R. McDONALD
By Donald G. Dalton
Attorney

3,411,285
WIRE PAY-OFF APPARATUS
James R. McDonald, Fairview, Ohio, assignor to United
States Steel Corporation, a corporation of Delaware
Filed July 28, 1966, Ser. No. 568,496
4 Claims. (Cl. 57—59)

ABSTRACT OF THE DISCLOSURE

Wire pay-off apparatus including a rotatable main shaft having an arm centrally mounted on the shaft with a stub shaft rotatably mounted on each end of the arm, a gear fixed to one end of each stub shaft, a free running gear mounted on the main shaft in mesh with the first gears, a support attached to the other end of each stub shaft having a spool shaft attached thereto with its axis in a plane normal to the axis of the main shaft, a wire supporting spool rotatably supported on each spool shaft, a pressure plate surrounding the spool shaft and resiliently urged against said spool, and resilient means for urging said pressure plate in a direction of opposite that of the spool.

---

This invention relates to wire pay-off mechanism and more particularly to such mechanism for paying off line wires to be stranded together in the manufacture of studded traction strands such as shown in Stokes Patent No. 3,167,280, dated Jan. 26, 1965. Apparatus suitable for making this strand is shown in the co-pending application of Stokes et al. application Ser. No. 479,506, filed Aug. 13, 1965. Prior to my invention the pay-off mechanism used in this machine was such that the wires were twisted about their longitudinal axes which is an undesirable characteristic. Also, because the line wires are payed-off in increments equal to the spacing of the studs the motion is intermittent and the mechanism previously used did not provide a uniform tension. The distance between the take-off point of the wire on the spool and the entry into the machine also varies as the position of the spool varies which increases the problem of maintaining uniform tension.

It is therefore an object of my invention to provide a wire pay-off mechanism wherein the wires are not twisted about their longitudinal axis and which feeds off the wire at a uniform tension.

This and other objects will be more apparent after referring to the following specification and attached drawings, in which.

Figure 1:
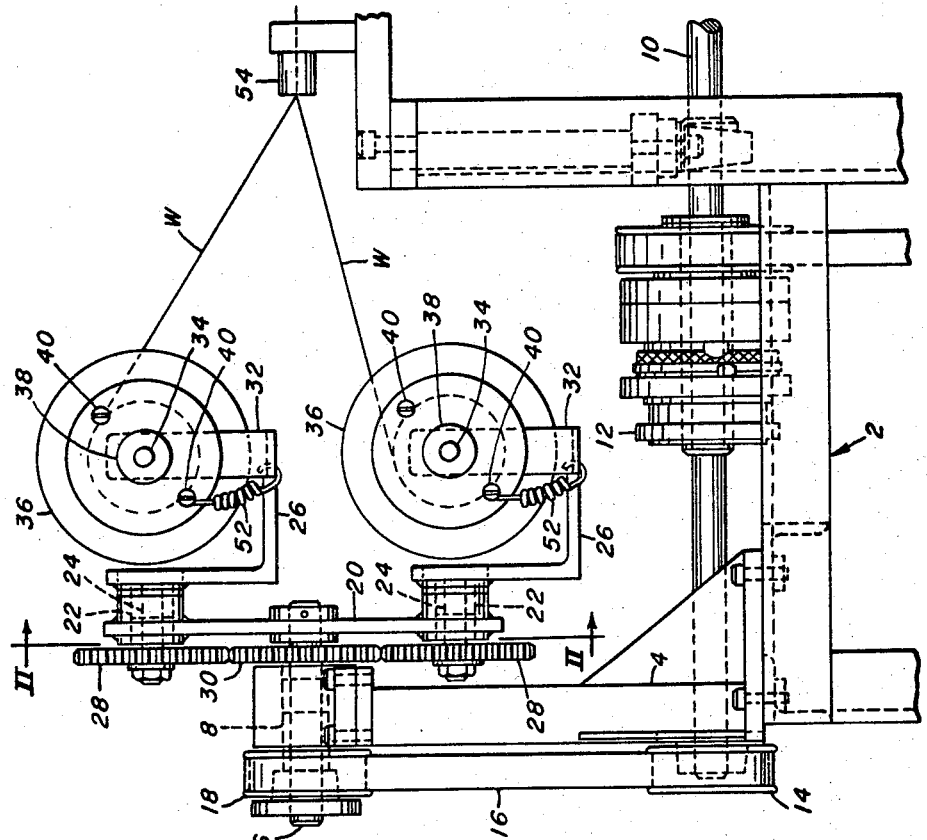
FIGURE 1 is a side elevation of the apparatus of my invention.
Figure 2:
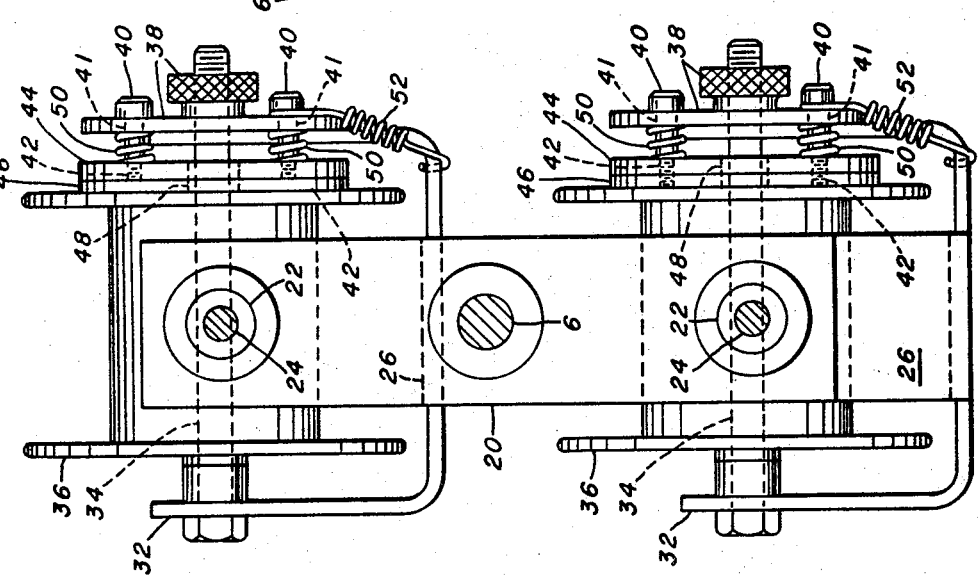
FIGURE 2 is a view, on an enlarged scale, taken on the line II—II of FIGURE 1.

Referring more particularly to the drawings, reference numeral 2 indicates a machine base having a bearing stand 4 mounted thereon. A shaft 6 is rotatably mounted in bearing 8 which is supported at the top of stand 4. The shaft 6 is driven from main drive shaft 10 through clutch 12, timing pulley 14, belt 16 and pully 18 secured to the shaft 6. An arm 20 is keyed to the end of shaft 6 and supports a pair of bearings 22, one at each end thereof. A stub shaft 24 is rotatably supported in each bearing 22. A spool holder 26 is attached to one end of each shaft 24 and a gear 28 is keyed to the other end of each shaft. Gears 28 are in mesh with a gear 30 which is mounted for free rotation on shaft 6. Each spool holder 26 has a U-support 32 attached thereto. Spool shaft 34 is supported on U-support 32 and rotatably supports spool 36 which carries wire W. An internally threaded pressure plate holder 38 is threaded on one end of shaft 34. Two bolts 40, which pass through diametrically opposed holes 41 in holder 38, with their axes parallel to the axis of shaft 34 have reduced diameter threaded ends 42 which are threaded into holes in a pressure plate 44 to support the same. The plate 44 has a composition face 46 which bears against one side of spool 36. The plate 44 has a central opening 48 therethrough which is substantially larger than the diameter of shaft 34 so that the bolts 40 provide the sole support for the plate 44. A spring 50 surrounds each bolt 40 between holders 38 and pressure plate 44 so as to urge the plate 44 against the spool 36.

A back lash compensating spring 52 has one end fastened to U-support 32 and the other end fastened to the pressure plate holder 38 by means of one of the bolts 40. It is necessary that the spring be attached to the pressure plate 44 directly or through holder 38 at a point which will cause the spring 52 to urge the plate 44 in a direction of rotation opposite that of spool 36.

If more than two wires are to be fed, there will be a separate stub shaft and spool mechanism for each wire with a gear on each stub shaft in mesh with the central gear.

In operation, the shaft 6 is driven from main drive shaft 10 and in turn drives rotating arm 20 with the gear 30 cooperating with gears 28 to maintain the shafts 34 parallel with one another. This is done by transferring the arcuate motion of stub shafts 22 into rotation through the gears 28. When wires W are withdrawn from the spools 36 and directed through entry guide 54, spool rotation is retarded by springs 50 forcing the pressure plate 44 against the spool 36. This retardation can be increased by screwing the holder 38 inwardly to decrease the distance between it and the side of spool 36.

When the wire W between the spool 36 and entry guide 54 becomes or tends to become loose for any reason, such as change of position of the wire on the spool with respect to guide 54 or by the intermittent feed, the compensating spring 52 retracts the pressure plate 44 and with it the spool 36.

While one embodiment of my invention has been shown and described, it will be apparent that other adaptations and modifications may be made without departing from the scope of the following claims.

I claim:
1. Wire pay-off mechanism comprising a rotatable shaft, means for rotating said shaft, an arm mounted on said shaft with its axis in alignment with the axis of said shaft, a stub shaft rotatably mounted on each end of said arm with their axes parallel to the axis of said first named shaft, a gear mounted on one end of each stub shaft for rotation therewith, a gear rotatable about the axis of said first named shaft and rotatable with respect to said first named shaft and in mesh with said first named gears, a support mounted on the other end of each stub shaft for rotation therewith, a spool shaft attached to said support with its axis in a plane normal to the axis of said first named shaft, a spool rotatably supported in said spool shaft for carrying wire to be paid off, a pressure plate holder attached to said spool shaft, a plurality of bolts secured to said pressure plate holder with their axes parallel to the axis of said spool shaft, a pressure plate surrounding said spool shaft and adapted to bear against said spool, resilient means urging said pressure plate against said spool, and resillient means for urging said pressure plate in a direction of rotation opposite that of said spool.

2. Wire pay-off mechanism according to claim 1 in which said resilient means urging said pressure plate against said spool is a spring surrounding each bolt and extending between said pressure plate holder and pressure plate.

3. Wire pay-off mechanism according to claim 1 in which said resilient means for urging said pressure plate in a direction of rotation opposite that of said spool is a spring having one end attached to said support and the other end attached to said pressure plate holder.

4. Wire pay-off mechanism according to claim 3 in which said resilient means urging said pressure plate against said spool is a spring surrounding each bolt and extending between said pressure plate holder and pressure plate.

References Cited

UNITED STATES PATENTS

| | | | |
|---|---|---|---|
| 187,306 | 2/1877 | Peacock | 57—65 XR |
| 2,277,102 | 3/1942 | Henning et al. | 57—59 |
| 2,571,061 | 10/1951 | Reynolds | 242—156 |
| 2,802,328 | 8/1957 | Ritchie | 57—65 XR |
| 3,109,605 | 11/1963 | Ostermann | 242—156 XR |

FOREIGN PATENTS 929,346   6/1955   Germany.

FRANK J. COHEN, *Primary Examiner.*

WERNER H. SCHROEDER, *Assistant Examiner.*